(12) United States Patent
Meissner et al.

(10) Patent No.: US 9,266,532 B2
(45) Date of Patent: Feb. 23, 2016

(54) DYNAMIC STABILITY CONTROL USING GNSS AND INS

(76) Inventors: Ute Marita Meissner, Köln (DE); Rolf Meissner, Köln (DE)

( * ) Notice: Subject to any disclaimer, the term of this patent is extended or adjusted under 35 U.S.C. 154(b) by 105 days.

(21) Appl. No.: 14/112,952

(22) PCT Filed: Apr. 3, 2012

(86) PCT No.: PCT/EP2012/056056
§ 371 (c)(1),
(2), (4) Date: Dec. 31, 2013

(87) PCT Pub. No.: WO2012/143238
PCT Pub. Date: Oct. 26, 2012

(65) Prior Publication Data
US 2014/0129088 A1  May 8, 2014

(30) Foreign Application Priority Data

Apr. 19, 2011  (DE) .................. 10 2011 018 172

(51) Int. Cl.
| | |
|---|---|
| *B60W 30/02* | (2012.01) |
| *B60W 10/04* | (2006.01) |
| *B60W 10/18* | (2012.01) |
| *B60W 10/20* | (2006.01) |
| *B60W 10/22* | (2006.01) |
| *B60W 40/10* | (2012.01) |
| *B60W 10/06* | (2006.01) |

(52) U.S. Cl.
CPC ............... *B60W 30/02* (2013.01); *B60W 10/04* (2013.01); *B60W 10/06* (2013.01); *B60W 10/18* (2013.01);
(Continued)

(58) Field of Classification Search
CPC ..... B60W 30/02; B60W 10/06; B60W 10/18; B60W 10/20; B60W 10/04; B60W 10/22; B60W 40/10; B60W 2550/402; B60W 2550/408; B60W 2550/406; B60W 2300/36
See application file for complete search history.

(56) References Cited

U.S. PATENT DOCUMENTS 3,996,590 A * 12/1976 Hammack ...................... 342/465
5,595,121 A *  1/1997 Elliott et al. .................... 104/53
(Continued)

FOREIGN PATENT DOCUMENTS

DE    10 2006 042961 A1    4/2007

OTHER PUBLICATIONS

Santiago Alban; "Design and Performance of a Robust GPS-INS Attitude System for Automobile Applications", Internet htt.Q:llwaas.stanford.edu/-wwu/QaQers/g.Qs/PDFIThesis/SantiagoAlbanThesis04..Qdf, Jan. 1, 2004, submitted in four parts.*
(Continued)

*Primary Examiner* — James Trammell
*Assistant Examiner* — James E Stroud
(74) *Attorney, Agent, or Firm* — Renner, Otto, Boisselle & Sklar, LLP (57) ABSTRACT

The invention relates to a method for controlling the driving dynamics of a vehicle, especially of a single-track or dual-track and vehicle. The driving dynamics of the vehicle are controlled by way of brake and/or engine intervention, notably depending on a change of the movement of the vehicle in the three-dimensional space and relative to the earth coordinate system and depending on the effective direction of gravity or the earth's gravitational pull. According to said method, the attitude or orientation and the position of the vehicle in three-dimensional space and relative to the earth coordinate system is determined by means of a satellite navigation system (GNSS) which comprises a receiver, mounted on/in the vehicle, having at least three antennas for reception of satellite navigation signals and an inertial measuring system (INS), mounted on/in the vehicle, for measuring all changes in the movement, position and/or attitude of the vehicle.

13 Claims, 4 Drawing Sheets

(52) U.S. Cl.
CPC ............... *B60W 10/20* (2013.01); *B60W 10/22* (2013.01); *B60W 40/10* (2013.01); *B60W 2300/36* (2013.01); *B60W 2550/402* (2013.01); *B60W 2550/406* (2013.01); *B60W 2550/408* (2013.01)

(56) References Cited

U.S. PATENT DOCUMENTS

| | | | |
|---|---|---|---|
| 2004/0098185 A1* | 5/2004 | Wang | 701/70 |
| 2007/0067085 A1 | 3/2007 | Lu et al. | |
| 2009/0171585 A1 | 7/2009 | Hoshizaki et al. | |
| 2011/0022267 A1 | 1/2011 | Murphy | |
| 2011/0231050 A1* | 9/2011 | Goulding | 701/26 |
| 2011/0266809 A1* | 11/2011 | Calverley | 290/55 |
| 2012/0298430 A1* | 11/2012 | Schroll et al. | 180/8.1 |

OTHER PUBLICATIONS

International Search Report for corresponding patent application No. PCT/EP2012/056056 dated Oct. 15, 2012.

Santiago Alban; "Design and Performance of a Robust GPS/INS Attitude System for Automobile Applications", Internet http://waas.stanford.edu/~wwu/papers/gps/PDF/Thesis/SantiagoAlbanThesis04.pdf, Jan. 1, 2004, submitted in four parts.

* cited by examiner

DYNAMIC STABILITY CONTROL USING GNSS AND INS

The invention relates to a method for controlling the driving dynamics of a vehicle, the vehicle being particularly a single-track or dual-track and vehicle.

DESCRIPTION OF THE STATE OF THE ART

The first driving dynamics control was put to commercial use around 1995 under the designation Electronic Stability Program (ESP). In subsequent years, driving dynamics control became very rapidly established as a useful accessory for increasing the active driving safety. Some car manufacturers also use the designations DSC (Dynamic Stability Control), VSA (Vehicle Stability Assist) or VSC (Vehicle Stability Control), Electronic Stability Control (ESC), and the like.

Driving dynamics control is defined as the adapting of the driving behavior of the vehicle to the driver's wish within the range of the limits of driving dynamics. For this purpose, there is first determined in what manner the vehicle should behave corresponding to the driver's wish (desired behavior). To this end, the steering wheel angle, the accelerator pedal position and the brake inlet pressure are measured. The real behavior of the vehicle (actual behavior) is measured via the three degrees of freedom of the vehicle in the plane (longitudinal, transverse and yaw speed around the orthogonal axis). The control system seeks to keep the normal deviation between the desired behavior and the actual behavior at a low level. To achieve this, the system will influence the tire forces in a suitable manner by brake intervention and engine intervention. More-recent systems also use steering intervention.

Driving dynamics control will fulfill its function only if the vehicle has sufficient ground contact. The driving speed is measured, in the classical way, on the basis of the rotation and the slippage of the wheels. In case of an absence of ground contact or very slippery ground (ice), the system will not be able anymore to detect the current driving speed. If two, three or four wheels should lift off the ground, the system would be left without the measurement value "driving speed".

Certain driving dynamics control systems are designed as side slip angle control systems or yaw-speed control systems. Large side slip angles will cause considerable errors in some measurement values.

In classical driving dynamics control systems, the driving speed and the transverse acceleration are detected relative to the longitudinal axis of the vehicle. In case of large side slip angles, the direction of the vector of the vehicle speed will not even approximately correspond to the longitudinal axis, nor will the direction of the vector of the transverse acceleration correspond to the transverse axis. In the classical approach, acceleration along the orthogonal axis is usually not considered at all.

In driving situations with critical driving dynamics, e.g. with large side slip angle and/or loss of ground contact, classical control systems will not be able anymore to measure movements of the vehicle (e.g. vehicle speed, transverse acceleration) because the system will have lost track of the vehicle's movements and thus of the orientation (arrangement in the reference system).

One argument in favor of the classical driving dynamics control systems resides in that, along with the loss of the measurement values, these systems will also lose the possibilities for adjustment so that the loss of the measurement values will then also have no negative consequences anymore. In case that the wheels should lift off, no wheel will be able to brake anymore. To this argument, it can be objected that, after a short lift-off with accompanying twisting, tilting, pitching and swaying movements or after an external impact onto the vehicle, the driving dynamics of the vehicle would be controllable again directly after re-establishment of the ground contact if the control system had not lost orientation in the meantime.

A new argument for the necessity that driving dynamics control systems must not lose orientation in any driving situation, arises from the field of the linking of vehicles in the car-to-car or car-to-X manner. The vehicles should be able to communicate their current position, attitude and moving directions at all times, notably, if possible, in an earth coordinate system.

Most of the known driving dynamics control systems have in common that they can measure the behavior of the vehicle merely via the three degrees of freedom of the vehicle in the plane (longitudinal, transverse and yaw speed/acceleration around the orthogonal axis). For this purpose, the acceleration sensors are fixedly connected to the vehicle. Thus, the driving stability will be detected by measurements in a plane, i.e. two-dimensionally. The measurement plane, provided that the vehicle's driving stability is sufficient, corresponds to the road surface, which is the relevant plane for the transmission of the force of the wheels onto the road.

All of the above systems have the disadvantage in common that, in case of a massive inclination of the vehicle, the measurement plane will, especially in the borderline range, indeed not correspond anymore to the road surface on which the force transmission of the wheels takes place.

The more the vehicle is inclined, the larger the measurement errors will be. In particularly critical driving situations in which the vehicle is already heavily inclined, drivers will thus place their hopes in the intervention of active safety systems which at this point have already ceased to function.

There exist various dangerous situations of the above kind where, due to the inclination angle of the vehicle, conventional acceleration measurement is not sufficient.

Each passenger car or mini van will already be in such a dangerous situation as soon as two of four wheels have clearly lifted off and the vehicle threatens to tilt or overturn.

In such a case, the measurement plane distinctly deviates from the road plane. Here, the conventional acceleration measurement is useless.

A further example is a motorcycle in an orientation for cornering. The measurement plane continuously deviates from the road plane in an extreme manner. For a motor cycle, the conventional measurement principle of the driving dynamics control, such as e.g. ESP, is unsuited so that, consequently, such systems have also not been realized in practice.

From the example of an application in motorcycles, however, a further massive disadvantage of conventional driving dynamics control systems becomes evident. The inclined orientation of a motorcycle is determined, on the one hand, by the centrifugal force and, on the other hand, by the gravitational force and especially the direction of this force. Conventional driving dynamics control systems, however, are not capable of measuring the direction of the gravitational force.

Not only in motor cycles, but also in dual-track vehicles the gravitational force has a considerable influence on the driving stability. Borderline ranges toward skidding, tilting, upturning and also sliding on a slope can be detected by means of measurement technology only if the direction of the gravitational force is captured as well.

There are several examples which make it obvious how decisive the measurement of the direction of the gravitational force is for the detection of the driving stability in the borderline range and which disadvantages the conventional systems have.

One example is an off-road vehicle which has been driving uphill on a steep slope and now, while driving, makes a turn in order to drive down the slope again. Conventional driving stability control systems cannot detect that the vehicle, which presently is in a position transverse to the slope, is about to overturn the next moment. Only by detecting the direction of the gravitational force, the instability of the driving situation can be measured. However, the sensorics of a conventional driving dynamics control system will not be able to detect the direction in which the gravitational force acts upon the vehicle.

Another example is a dual-track vehicle in a steeply banked curve. In such a situation, the measurement plane of the acceleration sensors does correspond to the road plane, while, however, the driving dynamics is considerably influenced by the inclination of the road surface. In steeply banked curves, conventional driving dynamics control systems have problems in correctly detecting the driving stability because the measurement of the transverse acceleration is adulterated/superseded by the gravitational force. A reliable measurement value can be obtained neither for the transverse acceleration nor for the inclination of the vehicle as long as the direction of the gravitational force is not known.

DISCUSSION OF INDIVIDUAL PRIOR ART DOCUMENTS

A common approach of the documents mentioned hereunder resides in performing the control of the driving dynamics of a vehicle by means of brake, engine and steering intervention. There exist essential differences in the ways of capturing or measuring the movement and respectively the change of movement of the vehicle in order to detect critical driving conditions which require an intervention in the driving dynamics.

Some documents describe driving dynamics control systems which include image sensor systems, e.g. DE-A-10 2004 022 289 and DE-A-10 2005 028 995. The image sensors detect the movement of the vehicle relative to its surroundings (road, houses, trees etc.). These systems, however, have the basic disadvantage that image sensors, even though they are suited for detection of movements of the vehicle, cannot detect the effective direction of the gravitational force.

A further group of documents describe driving dynamics control systems comprising up to three translatory and three rotary acceleration sensors which will detect the movement of the vehicle via changes of movement (see DE-A-10 2009 000 922, DE-A-102 32 362 and DE-A-102 20 575). These systems can detect the effective direction of the gravitational force only at standstill. Since these systems detect the movements of the vehicle by integration of measured acceleration values, the thus detected values are subject to drift. The vehicle's spatial attitude in earth coordinates and the effective direction of the gravitational force during the driving cannot be detected in this manner.

US-A-2008/0147280 describes a passenger protection system. In this document, there is described, as a possible solution, a system comprising a combination of an IMU (Inertial Measurement Unit) with GPS, which are coupled via Kalman filter. The system depicted in FIG. 35 of said document includes a GPS receiver for position detection. Three antennas for detection of the attitude are not provided. In [0410] of said document, it is stated with reference to FIG. 35 therein that the IMU will detect the position of the vehicle and said GPS receiver will periodically calibrate these position data. No mention is made of a GNSS attitude detection.

After all, the functional principle described in US-A-2008/0147280, which can do without GNSS attitude detection, appears reasonable for the application described in said document because this system is a passenger protection system which is desired to be reactive whenever a skidding, drifting, twisting or a threat of upturning has been detected. In a tired and vehicle, its attitude ("heading") corresponds to its moving direction, derived from two position signals, until one of said events, such as e.g. skidding, drifting, twisting, upturning, will have occurred.

DE-C-101 48 667 describes a method for determining a vectorial vehicle speed. This system makes use, on the one hand, of the measurement of the speed vector by three translatory and three rotary acceleration sensors and by integration, and, on the other hand, of one or a plurality of GPS receivers together with a total of two or three antennas. The speed vector is said to be used also for driving dynamics control. However, the system serves exclusively for the detection of the driving speed vector and of the side slip angle. There is not disclosed a way for detecting the direction of the gravitational force.

In contrast to the above mentioned documents, WO-A-2005/119290 describes a system for steering control of a vehicle. The system is to be used for guiding a tractor across a field while keeping it on its predetermined course, e.g. for plowing the soil, with high precision. The subject matter of this document comprises a GPS receiver, provided with two or more antennas, which is able to detect the position and the attitude of the vehicle. Here, however, the information about the position and the attitude serves for steering the vehicle in such a manner that the deviation between the desired and the actual course of the treated parallel moving paths is minimal. Thus, what is controlled here is not the driving dynamics but the driving path. The steering intervention is not used to stabilize the driving dynamics of the vehicle but to guide the vehicle on the desired course.

It is an object of the invention to improve the classical driving dynamics control systems and to design them in a more efficient manner.

To achieve the above object, the invention proposes a method for controlling the driving dynamics of a vehicle, particularly a single-track or dual-track and vehicle, wherein
   the driving dynamics of the vehicle are controlled by way of brake and/or engine intervention, notably depending on the movement of the vehicle in the three-dimensional space and relative to an earth coordinate system and depending on the effective direction of gravity or the earth's gravitational pull,
   the attitude or orientation and the position of the vehicle in three-dimensional space and relative to the earth coordinate system is determined by means of a satellite navigation system (GNSS) which comprises a receiver, mounted on or in the vehicle and having at least three antennas for reception of satellite navigation signals, and by means of an inertial measuring system (INS), mounted on or in the vehicle, for measuring all changes in the movement, position and/or attitude of the vehicle, and,
   from the values of the position and attitude of the vehicle and from the coordinates of the center of gravity of the earth or the center of the earth or of the origin of the earth coordinate system, there is computed, in real time, the direction of the gravity acting on the vehicle, or the direction of the vector from the center of gravity of the vehicle to the center of gravity or the center of the earth in ground-based and/or vehicle-based coordinates.

According to the invention, it is thus proposed to include also the orientation of the vehicle in space into the driving dynamics control. Thereby, it can be detected particularly in which direction the gravitational force acts on the vehicle. Apart therefrom, the data about the attitude/orientation of the vehicle in space can still be detected even when, in a borderline situation, the vehicle has no contact to the ground anymore. Drifting, twisting and sliding are no events anymore which will cause a loss of orientation on the side of the driving dynamics control, but, instead, are driving conditions which the driving dynamics control will largely cope with and which it will transform into safe driving conditions. Finally, the driving dynamics control system can be designed to be more reliable also for off-road rides and rides in steeply banked curves.

By use of GNSS and INS, all movements of the vehicle and, above all, the vehicle's orientation (attitude, heading) can be detected in three dimensions and in absolute earth coordinates. Both the course angle and the yaw angle, and thus also the side slip angle will be detected in the form of earth coordinates. This also applies to the vehicle's speed in terms of amount and direction. The following partially model-based parameters of a classical driving dynamics control system can be replaced, by way of GNSS- and INS-based measurements, by absolute permanent measurements in earth coordinates:

Longitudinal and transverse speed, longitudinal and transverse acceleration, yaw angle, yaw speed, side slip angle, slide angle at the front and the rear (via steering wheel angle).

This is to say: All movements and changes of movement of the vehicle are measurable in three dimensions. Only the forces on the wheels and the moments on the vehicle are not measurable. Also in the classical driving dynamics control system, however, these are detected via the vehicle model and via linearized or characteristic-line-based wheel models.

Apart from the above, in the earth coordinate system, the effective direction of the gravitational force acting onto the vehicle is continuously measurable and respectively is computable on the basis of the vehicle's position and attitude. The vector of the earth' gravitational force acting on the vehicle points from the center of gravity of the vehicle to the center of gravity of the earth. In a simplifying manner, the center of gravity of the earth can be assumed to be the center of the earth or the center of the earth-based co-ordinate system with the coordinates M=(0,0,0). From the direction of this vector and the attitude of the vehicle in earth coordinates, "world frame", it is already possible to compute the relative angles between the effective direction of the gravitational force and the chassis of the vehicle. For making it possible that the information about the gravitational force acting on the vehicle is used as a vector in a mathematical model of the vehicle, one can perform a transformation of the coordinates of this vector from earth coordinates into vehicle coordinates, "body frame". Thereby, the effective direction of the gravitational force in relation to the vehicle will be obtained. Both coordinate systems with corresponding designations are described for aircraft in DIN 9300-1. As a reference for an aircraft/vehicle, there is usually determined a vehicle-based reference axis system whose x-axis is parallel to the longitudinal axis of the body. The establishing of movement equations is facilitated if the coordinate system is related to the center of gravity of the aircraft/vehicle.

An example of a realization:
Detection of the position and attitude of the vehicle
Detection of the movement of the vehicle (speed as vector)
Computation of the effective direction of the gravitational force
Transformation of the coordinates of both vectors into vehicle coordinates
Detection of amount and direction of the vehicle's transverse acceleration and of all other translatory and rotary accelerations
Computation of the forces and moments on the vehicle and wheels via a mathematical model of the vehicle As has been the case in the classical driving dynamics control system, the behavior of the vehicle with respect to the actual values can be detected, by use of the single-track vehicle model, on the basis of the steering angle, the vehicle speed and accelerator pedal/brake pedal values.

As in the classical driving dynamics control system, it is possible to control the side slip angle and the yaw speed.

The deviation between the desired and actual values of the yaw speed can be set/corrected via a yaw set moment by means of the wheel brakes, as in the classical driving dynamics control system. Further actuators are the steering system, the engine and electronically adjustable torque distribution transmissions in the power train, tilt angle adjustment by chassis adjustment devices, electronically adjustable spoilers or flaps.

For rides on unpaved roads and on off-road terrain, the position of the accelerator pedal can be used for recognizing a maximal desired side slip angle as a wish on the side of the driver. For instance, a large moving range traversed by the accelerator pedal will lead to large tolerated side slip angles (drifts).

The driving dynamics control according to the invention will detect the road inclination as well as uphill and downhill grades and will consider these angles in the process of controlling the driving dynamics, e.g. on the basis of a vehicle model which has been extended by inclusion of these angles or only of the effective direction of the gravitational force.

Advantages:
The driving dynamics control of the invention will detect the attitude and the speed vector even if the vehicle should lose ground contact.

The driving dynamics control of the invention will function even in case of large side slip angles.

In critical driving situations such as e.g. sliding, twisting, tilting, skidding or external impacts, the driving dynamics control of the invention will keep going on continuously because the measurement values of the vehicle movement have been detected in an unadulterated manner and without interruption.

According to an advantageous embodiment of the invention, the inertial measurement system can be calibrated by means of the satellite navigation system so that the inertial measurement system (INS) will provide the measurement data of the position and attitude of the vehicle at a distinctly higher rate than the satellite navigation system. Thus, with the aid of the measurement data of the satellite navigation system, the result of the determination of the movement, position and attitude performed by the inertial measurement system can be updated at all times. The inertial measurement system is operative on the basis of acceleration sensors, i.e. it always detects the changes of the movement and, from these, the position and attitude of the vehicle by way of integration, which over time will be performed in an ever more imprecise manner because of the occurring drift. Since the data about the movement, position and attitude of the vehicle according to the inertial measurement system are always continuously—i.e. in short time intervals—adjusted by the corresponding data of the satellite navigation system, it is always possible to detect the attitude, the position and the attitude of the vehicle with precision.

According to a further advantageous embodiment of the invention, it can be provided that the measurement data of the satellite navigation system (GNSS) and of the inertial measurement system (INS) are coupled by a Kalman filter, wherein, in those periods of time in which the satellite navigation system is providing no data or no evaluable data, the detection of the changes of the movement, position and/or attitude of the vehicle will be continued, and wherein it can be provided particularly that data with a repetition rate higher than 10 Hz are available at the output of the Kalman filter.

The inertial measurement system (INS) should be fixedly connected to the vehicle and will measure all three orthogonally arranged translatory accelerations as well as all three orthogonally arranged rotary accelerations.

Apart from the above mentioned influence taken on the driving dynamics of the vehicle by brake intervention (deceleration of the vehicle optionally—and particularly selectively—for individual wheels) and by engine intervention (short-time acceleration), the driving dynamics of the vehicle can be additionally controlled also by steering intervention.

The engine intervention can be extended by electronically adjustable torque distribution devices (locks, brakes, transmissions) in the power train.

The driving dynamics, especially the tilt angle, can be favorably influenced by electronically adjustable chassis adjustment devices.

In case that, at higher speeds, the ground contact of the wheels is briefly interrupted, a safe driving condition can be reestablished by electronically adjustable spoilers or flaps.

According to an advantageous embodiment of the invention, it can be provided that the position, movement and/or attitude data, and/or data about the change of the position, movement and/or attitude of adjacent other vehicles, and/or data about the condition of the underlying ground particularly with regard to its static friction, are used for the driving dynamics control, and/or that the position, movement and/or attitude data, or data about the change of the position, movement and/or attitude of the vehicle are communicated to adjacent other vehicles (accident avoidance e.g. by indication of slippery road conditions, highly dynamic collision avoidance).

Finally, it is also possible that the position, movement and/or attitude data or data about the change of the position, movement and/or attitude of the vehicle are communicated to driver assistance systems e.g. for distance measurement, collision avoidance and/or for active protection of the occupants from injury in case of an accident, e.g. an air bag and/or belt tensioner, or extendable roll-over bars. Of course, the position, movement and/or attitude data or data about the change of the position, movement and/or attitude of the vehicle can also be used for navigation of the vehicle.

As already mentioned above, by detecting the effective direction of the gravitational force and by evaluation of the attitude of the vehicle in the earth coordinate system together with the evaluation of accelerations in space, the driving dynamics control system of the invention will offer protection from tilting and/or overturning. The driving dynamics control system of the invention further makes it possible, by detection of the gravitational force and evaluation of the attitude of the vehicle in the earth coordinate system, that a ride on an inclined (banked) road (steeply banked curve) or on off-road terrain will be detected and the driving dynamics will be controlled correspondingly.

A further advantage of the invention resides in its applicability for single-track vehicles in which, now, the driving dynamics control—through detection of the inclined orientation, the vehicle speed, the transverse acceleration and the yaw angle with reference to the earth coordinate system—can maintain and respectively reestablish the driving stability by brake intervention and/or steering intervention as well as engine intervention.

The invention will be explained hereunder in comparison to known systems for driving dynamics control of single- or dual-track vehicles with reference to the drawings. In the individual Figures, the following is shown:

FIG. 7 is a plan view of a single-track vehicle with rear-wheel steering (schematically outlined), In order to make it possible, when performing the acceleration measurement, to compensate for the disadvantage of a possible deviation between the measurement plane and planes which are relevant for the driving dynamics, such as e.g. the road plane or the surface of the earth, it is reasonable to detect each movement of the vehicle in three-dimensional space. For this purpose, the vehicle is provided with three translatory and three rotary acceleration sensors. Thus, all movements of the vehicle are measurable as a vector having an amount and a direction. If the measurement plane of the vehicle becomes displaced relative to the plane of relevance for the driving dynamics, as caused e.g. by inclination of the vehicle, all movements on the relevant plane can be accurately captured, provided that the orientation of the relevant plane can be clearly detected by the system. This requires, as a precondition, that the system for controlling the driving stability can be oriented.

The term "orientation" pertains to the placement in a reference system. This includes the knowledge of its own position and attitude and of their changes. This also includes the knowledge of one's own moving speed and moving direction in the reference system. Further, this includes the knowledge of the effective direction of the gravitational force.

Presently, its own position (without determination of the attitude) can be easily measured by a GNSS navigation receiver. The position data will be captured in world coordinates and are usually present in the system in WGS 84 format. The measurement of the attitude and respectively orientation of a vehicle by means of GNSS receivers is presently not yet commonly used.

Figure 1:
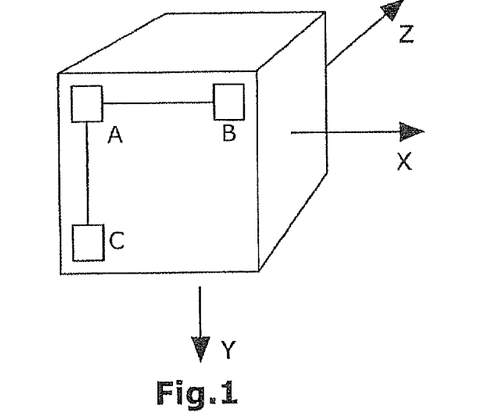
FIG. 1 is a schematic view of the arrangement of three acceleration sensors and respectively yaw rate sensors for detection of the attitude and respectively orientation of an object in a reference system (e.g. in space)

Presently, for measurement of the attitude of satellites, use is often made of three reception antennas, all of them receiving the signal of a transmitter. From the signal propagation delay and the phase difference, the angle of incidence of the signal can be measured unambiguously and with very high precision. From the known position of transmitter and receiver, there is thus obtained the attitude of the receiver in the reference system (FIG. 1).

If its own position and attitude in the reference system is known, it is possible, by use of three rotatory and three translatory acceleration sensors, to detect each change of position and attitude in terms of amount and direction (Inertial Navigation System INS).

For orientation (navigation) of aircraft, it has been evidenced by practical tests, e.g. at Stanford University, that the combination of a GNSS receiver comprising three antennas and a system comprising three rotatory and three translatory acceleration sensors of a simple design from the field of automobiles is an ideal combination for orientation in the reference system (navigation).

The INS system guarantees that the data about the position and attitude are updated clearly faster than 50 times per second. The GNSS system provides reliable, highly accurate data on position and attitude distinctly more slowly than INS.

In case that the GNSS system should cease functioning for a short time due to shadowing, the INS system will be capable to continue the navigation and position detection for minutes without the GNSS. As a consequence, however, errors will be caused due to a drift of the INS. Thus, in this form, GNSS and INS complement each other in an ideal manner.

Application in a Vehicle

The use of GNSS receivers in vehicles is common practice. The installation of three antennas for measurement of the angle and the orientation (attitude) should not involve any bigger technical expenditure. The acceleration sensors are also common in ESP systems whereas, according to the invention and in contrast to ESP, there should be used six sensors, notably three rotatory and three translatory sensors. The combination of GNSS and INS is established e.g. via Kalman filters.

The use of this inventive system in a vehicle as sensories for driving dynamics control will offer a considerable advantage in comparison to the use for navigation in aircraft:

In a vehicle, the same system can serve both for orientation in real time (navigation) and for measurement of vehicle movement (acceleration) in the reference system. (The reference system is a world coordinate system such as e.g. WGS 84.) Since the attitude of the vehicle is measured in the reference system, also the direction of the gravitational force relative to the vehicle chassis is known at all times. Thus, also the inclined orientation or tilt of the vehicle in the right, left, forward and rearward directions can be easily computed. Also the accelerations in terms of amount and direction are measured in the reference system (world coordinate system).

Thus, the system of the invention is also suited for control of the driving dynamics in the previously critical cases of a motorcycle, a vehicle in off-road terrain, or steeply banked curves.

Further, the system provides valuable data for other systems:
  position for navigation systems
  position, attitude and speed vector for communication and for accident avoidance car-to-car or car-to-X in real time accident prediction
  information in real time for safety systems such as e.g. belt tensioners and airbags.

Assuming that the vehicle is one of a higher-ranking technical design, this system will save more hardware than it needs in the way of additional hardware.

Driving Dynamics Control For Motor Cycles

The control strategies of known driving dynamics control systems such as e.g. ESP are based on the approach to follow the driver's wish as precisely as possible without allowing the vehicle to get into an instable driving condition thereby. In the process, the driver's wish (desired value) is detected via sensors and is compared to the actual value of the driving condition. The driver's wish is detected on the basis of the steering wheel angle, the position of the accelerator pedal and the brake pedal pressure (force); the driving condition is measured on the basis of translator and rotator accelerations and of steering movements and rotator movements of the wheels.

A driving dynamics controller will compare desired values and actual values And—by intervention in the brakes, the steering system and the engine—will perform an adjustment to achieve the smallest possible deviations from the desired values while reaching the highest possible driving stability.

For this purpose, ESP and other systems use subordinate yaw rates and side slip angle control values.

For the most part, these system are functional with reference to the road level, i.e. in a two-dimensional manner.

The State of the Art

ABS (anti-blocking system) and ASC (anti-skid control) for motor cycles are known.

Up to now, technical literature offers only little information on driving dynamics control systems such as e.g. ESP provided for use in motor cycles. In DE-A-102 32 362, a system is described wherein the (rear and/or front) brake pressure is reduced in dependence on the measured transverse acceleration and wherein, on the basis of the yaw rate, also the cornering forces of the wheels are detected. In the above mentioned document, mention is also made of the "disturbing inclined orientation" of the motor cycle when riding along a bend "so that simple mechanical devices for determining the transverse acceleration are not available".

In DE-A-10 2004 022 289, there is described a driving dynamics control system with image sensor system, wherein an image sensor system is used for three-dimensional detection and modeling of the vehicle movement. The system will detect yaw movements as well as rolling and pitching movements and is said to able, in this manner, to detect also the inclined orientation of the motor cycle relative to the road surface.

Also in DE-A-10 2005 028 995 Al, a method for driving dynamics control for motorized single-track vehicles is described, wherein, with the aid of a camera and an image-sequence evaluation unit, the pitch angle and the inclined orientation are detected and the driving stability is maintained by means of the brake functions.

These systems, however, cannot detect gravitational forces, i.e. gravity.

Figure 2:
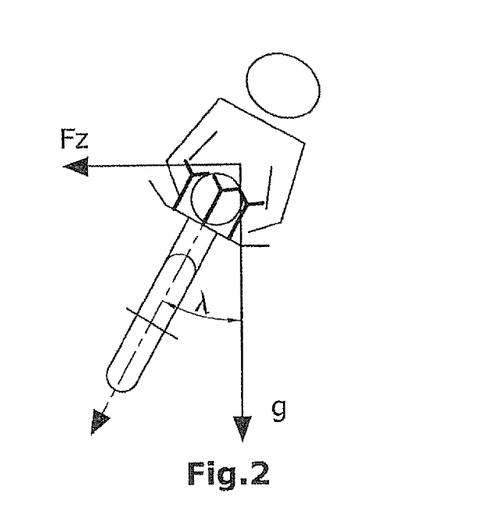
FIG. 2 is a view of a single-track two-wheeled vehicle, e.g. a motor cycle, in an inclined orientation for visualization of the attacking forces.

The driving dynamics of a motor cycle during a cornering process (see FIG. 2) is determined by the gravitational pull of the earth/gravity and by the centrifugal force.

$$Fg = \tan \lambda * m * g$$

Fg: force caused by the gravitational pull of the earth
m: mass of the vehicle $$Fz = m * \frac{m * v^2}{r}$$

Fz: centrifugal force
$\lambda$: angle of inclination

For the inclined orientation of the motorcycle in relation to the gravitational pull of the earth/gravity, neglecting the gyroscopic effects and the width of the tires, there applies:

$$\lambda = \arctan\left(\frac{v^2}{g \cdot R}\right) = \arctan\left(\frac{\ddot{y}}{g}\right)$$

v: driven speed
g: acceleration of the earth
R: radius of the curve movement
ÿ: transverse acceleration in the earth-based coordinate system The inclination of the road surface is not considered herein because it is not of decisive relevance.

The equation shows that the inclined orientation is directly proportionate to the transverse acceleration in the earth-based coordinate system. From the inclined orientation, one can thus compute a transverse acceleration which is expected to occur in the state of stability while driving.

If the measured transverse acceleration deviates therefrom, the driving condition is correspondingly instable.

For constant values of the inclined orientation, the equation will result in a curve radius for each predetermined speed.

The motorcycle as a one-track vehicle is an inherently instable system around its longitudinal axis. The driver is continuously seeking to stabilize the motorcycle by the steering assembly.

Theoretically, the driver's wish, as in a four-wheeled vehicle, can be detected on the basis of the steering angle, the angle of the throttle grip, and the force of the brake pedal. Since, however, for different lateral inclinations of the road surface, the steering angle will not be constant at identical speeds and identical inclined orientations, it appears reasonable to choose as the driver's wish not the steering angle but the curve radius which at a certain driving speed will result from the inclined orientation set by the driver. Accordingly, what is measured is the driving speed and the inclined orientation in order to detect the driver's wish "curve radius". The desired values of the driving dynamics control have thus been detected.

The actual values can be detected by continuous detection of the position and attitude of the motorcycle in the earth coordinate system and from changes of movement. A deviation of the transverse acceleration in the earth coordinate system from the value computed on the basis of the inclined orientation will indicate skidding. The observance of the curve radius R computed from the inclined orientation and the driving speed can be controlled via the yaw rate. If the measured yaw rate deviates therefrom or is changing too rapidly, a wheel is skidding. Should the inclined orientation change rapidly, lowsider crashes (tilting to the side) or even highsider crashes (tilting upward) are to be expected. Should there be detected a fast pitch movement, a danger of overturning exists. The side slip angle can be computed, according to DIN 700000, by $\tan \alpha = dvy/dvx$. The side slip angle allows conclusions on the current transmission forces of the tires.

High-frequency portions in the measured accelerations indicate weaving or wheel judder.

Figure 7:
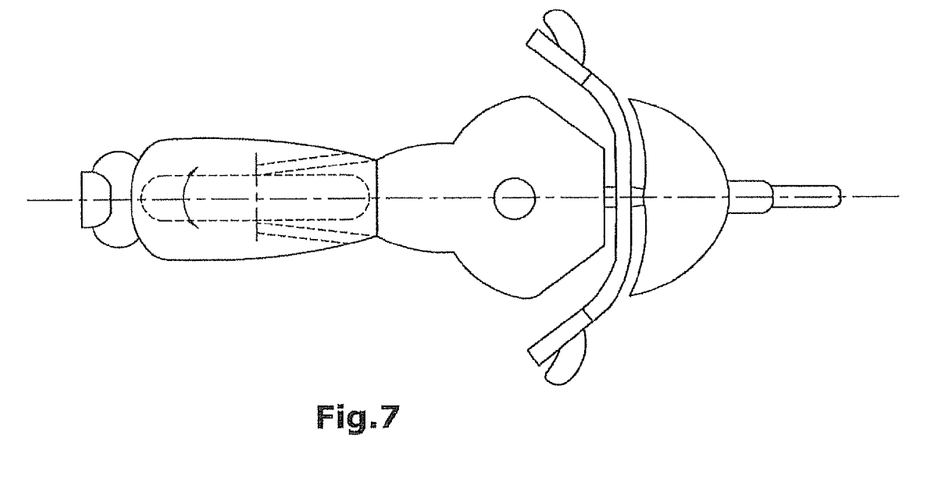

Upon detection of the above instabilities, a driving stability control can react as follows:

Release of the brake in case that a wheel is sliding. Release of the brake in case of danger of lowsider or highsider crashes. Intervention in the engine control e.g. for the same purpose. Steering the front wheel for correcting the inclined orientation. Steering movement of the rear wheel by a few degrees for improving or restoring the ground contact and reducing a dangerous inclined orientation (see the schematic representation in the plan view shown in FIG. 7).

The control of the driving dynamics of the motorcycle as described herein in accordance with the invention is possible only because the movements of the motorcycle with all translatory and rotatory accelerations are detected in three-dimensional space in absolute earth coordinates. The inclined orientation will be measured in relation to the direction of the gravitational force.

Driving Dynamics Control in an Off-Road Vehicle

When driving on off-road terrain, particular dangers will emerge since the topography of the terrain includes angles of inclination by which the vehicle during its drive through the terrain may be brought into precarious inclined orientations.

The vehicle threatens to topple over or to overturn. The toppling or over-turning in situations of very slow speeds is primarily determined by the attitude of the vehicle in the terrain and by its center of gravity, i.e. by the gravitational force. In addition to the gravitational force, also accelerations of the type related to driving dynamics will be of influence.

The State of the Art

Described in DE-A-32 22 149 is a device for preventing lateral tilting of a vehicle, particularly of a straddle carrier which is carrying a load, particularly a container. Said device detects the weight and the height of the center of gravity of the load, as well as the steering angle and the speed of the vehicle. The system detects a static stability from the center of gravity and the weight of the load, and a dynamic stability during cornering from the steering angle and the driving speed. When the static stability and the dynamic stability are compared and a limiting value is fallen short of, a control signal e.g. for braking is output.

New Approach:

The center of gravity of an unloaded vehicle can be easily determined by the manufacturer. The presence of a passenger is detected, by measurement technology, so as to allow for a seat-belt warning. The presence of the driver is here considered as a given fact. Possibilities for detection/measurement of additional loads are known but will not be further discussed here.

Figure 3:
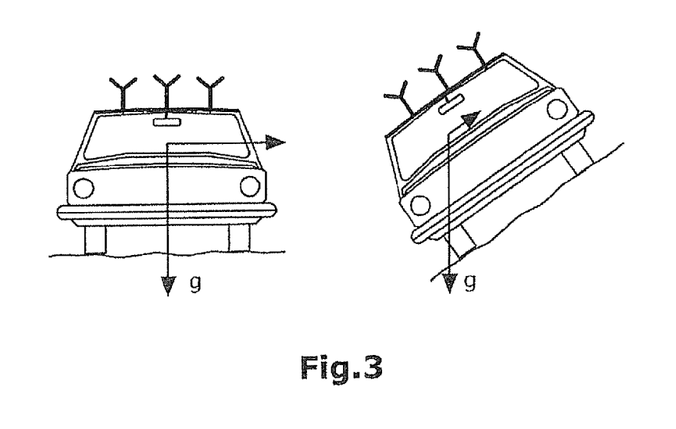
FIGS. 3 to 5 are views of a dual-track vehicle in different orientations for visualization of the respective attacking forces.
Figure 4:
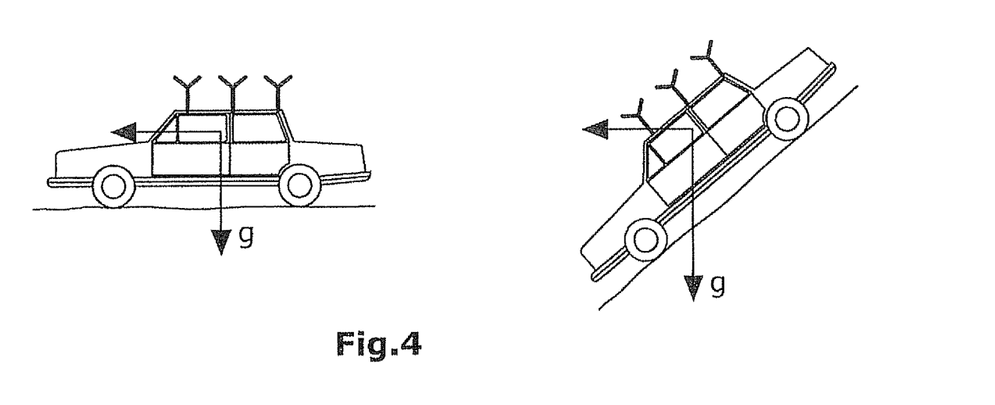

In FIG. 3, a vehicle in off-road terrain is illustrated (left-hand curve). The forces acting on the vehicle (center of gravity) are schematically represented. If the attitude and the geometry of the vehicle are known, it can be quickly detected on the basis of the forces acting on the vehicle whether the vehicle is still driving in a stable manner or will soon tilt over. A borderline range can be included into the process. From the Figure, it is evident that is computation is possible only if the direction of the gravitational force is known.

FIG. 3 shows a vehicle which threatens to overturn while braking on a slope.

Several approaches exist for the detection of tilting or tipping in combination with classical driving dynamics control systems. One approach is the detection of the forces in the resilient suspension struts. A further approach resides in the measurement and limitation of the transverse acceleration and/or yaw speed (DE-A-10 2009 0090 922). However, how dose the vehicle has come to tilting can be realistically determined only if the direction of the gravitational force is known. Classical systems have as yet been unable to detect the direction of the gravitational force.

GNSS & INS

By the method of the invention, which is based on a combination of GNSS and INS measurement data, the attitude of the vehicle can be detected in real time. The measurement is performed in an earth coordinate system (e.g. WGS84). In the earth coordinate system, the gravitational force acting on the vehicle, and particularly the direction of this force, are calculable because the vector of the gravitational force points toward the center of the earth or the center of the earth coordinate system M=(0,0,0) or the center of gravity of the earth. From the three-dimensional acceleration measurement by which all accelerations are obtained in terms of amount and direction, all forces acting on the vehicle can be detected, The vehicle is supported via the tires. On the basis of the geometry of the vehicle, the position of the center of gravity and the attitude of all four wheels, it can be computed whether the attacking forces are tilting the vehicle or are preventing it from tilting (moment of tilt).

If the vehicle threatens to tilt, the driving dynamics control of the invention will be able, by brake intervention, engine intervention with controlled torque distribution in the power line, steering intervention or intervention in the (hydrodynamic) chassis, to maintain or improve the still existing driving stability and respectively to prevent a further deterioration.

The driving dynamics control system of the invention can be combined with conventional control systems, e.g. side slip angle control and yaw rate control; these, however, must not be related to a road surface in a two-dimensional manner but have to be related to the earth coordinate system in a three-dimensional manner.

Detection of the inclination of the road surface, improved driving dynamics control for two-track vehicles A further important parameter for detecting the driving dynamics of a vehicle is the inclination of the road surface. Classical systems cannot detect the inclination of the road surface and the uphill/downhill grades. Since, in case of an inclined road surface, the gravitational force of the earth will contribute to the transverse acceleration, the measurement value "transverse acceleration" will be generally adulterated in classical systems. There exist approaches for detecting the inclination of the road surface in classical systems by means of plausibility checking. These methods, however, are not very precise because, even though they do measure the earth's acceleration in terms of amount, they do not measure this acceleration in terms of the direction in which it acts on the vehicle, but will measure instead the effect of the changed direction of the earth's acceleration.

Figure 5:
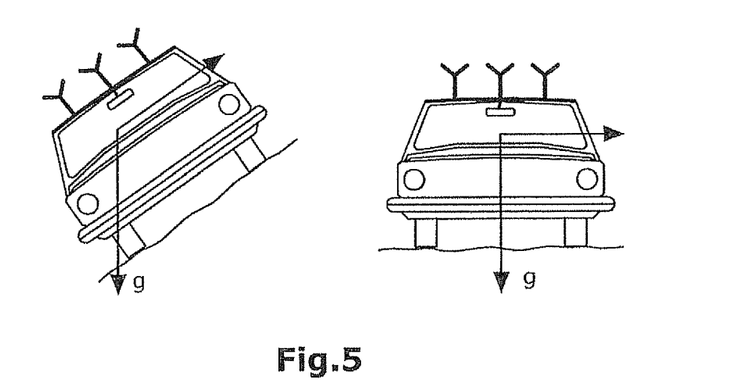

In heavily inclined (banked) curves, i.e. for instance in steeply banked curves, usual driving dynamics control systems for two-track vehicles, such as e.g. ESP, have the problem that the transverse acceleration will be partially compensated by the earth's acceleration (gravitational force g), which may lead to erroneous measurements and consequently to erroneous functioning of the driving dynamics control. In case of a non-inclined road surface extending orthogonally to the gravitational force (as usual), the direction of the transverse acceleration extends orthogonally to the direction of the gravitational force so that the gravitational force cannot contribute to the transverse acceleration. In case of an inclination of the road surface (relative to a plane extending orthogonally to the gravitational force), there occurs an overlap of the transverse acceleration and the earth's acceleration (FIG. 5).

In order to largely exclude an erroneous functioning caused by erroneous measurements on inclined road surfaces, present-day driving dynamics control systems have been programmed to include relatively wide so-called dead zones.

Plausibility checks on the basis of the yaw speed, which likewise are provided for this purpose, have a temporal delay which will cause the control to react too slowly.

State of the Art:

DE-A-102 20 575 describes a method for detection of a steeply banked curve which, on the basis of height level signals on all four wheels, detects the pitch movement in chassis and, from this pitch movement, a steeply banked curve. The system is provided for driving dynamics control systems.

Detection of Steeply Banked Curves by GNSS and INS

By the method which—according to the invention—makes use of GNSS and INS, the inclination of the road surface is easily measurable when applying the system to two-track vehicles. For this purpose, the inclination of the vehicle is measured in real time via the angle measurement of the GNSS by means of three antennas. The inclination of the road surface will correspond relatively exactly to the inclination of the two-track vehicle if at least three of the four wheels have ground contact. The ground contact of the wheels can be detected on the basis of driving forces, braking forces and rotary movements of the wheels. A slight deviation between the inclination of the vehicle and the inclination of the road surface also during ground contact is caused by differences in the spring travel of the wheels. This deviation, however, is without relevance for a driving dynamics control system. By measuring the spring travel of the suspension struts, also this deviation can be measured and the measurement of the road surface inclination can be corrected.

Improved "Orientation" For Driving Dynamics Control Systems

It has already been pointed out that a two-track vehicle loses the "orientation" when two out of four wheels have already lifted off. By the method of the invention, which makes use of GNSS and INS and includes the measuring of the position and attitude in the earth coordinate system, the orientation can be detected even if, for instance, the vehicle has already overturned. In this case, the possibilities for intervention will however be limited unless the vehicle has landed on its wheels again.

Further, these data about vehicles involved in accidents can be of use in future car-to-car and respectively car-to-X systems (communication between the vehicles and with the infrastructure) in order to prevent secondary accidents (such as e.g. car pile-ups). With the aid of car-to-car communication, a crossing vehicle can be prevented, by brake intervention or engine intervention, from colliding with the vehicle that has already been involved in the accident but is still moving.

Figure 6:
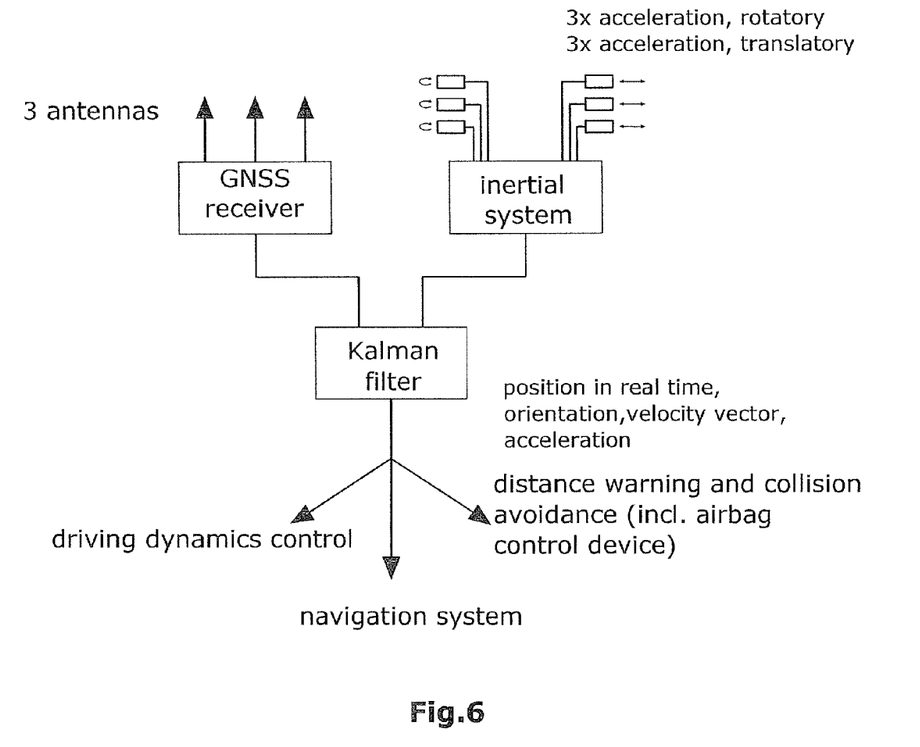
FIG. 6 is a generalized view of the principle components of a combined GNSS and INS measurement system.

FIG. 6 shows the overall measurement system with GNSS and INS as used for the driving dynamics control (and for further applications).

The invention claimed is:

1. A method for controlling the driving dynamics of a single-track or dual-track and vehicle, wherein the driving dynamics of the vehicle are controlled by way of brake and/or engine intervention, notably depending on the movement of the vehicle in the three-dimensional space and relative to an earth coordinate system having the center of gravity of the earth as its origin, the attitude and the position of the vehicle in three-dimensional space and relative to the earth coordinate system are determined by means of a satellite navigation system (GLASS) which comprises a receiver, mounted on or in the vehicle and having at least three antennas for reception of satellite navigation signals, and by means of an inertial measuring system (INS), mounted on or in the vehicle, for measuring all changes in the movement, position and/or attitude of the vehicle, wherein the driving dynamics control performed by brake and/or engine intervention is carried out additionally in dependence on the effective direction of the gravitational force or the force of the gravitational pull of the earth, from the values of the position and attitude of the vehicle and from the coordinates of the center of gravity of the earth, there is computed, in real time, the direction of the gravity acting on the vehicle, or the direction of the vector from the center of gravity of the vehicle to the center of gravity of the earth in ground-based and/or vehicle-based coordinates.

2. The method according to claim 1, characterized in that the inertial measuring system (INS) is being continuously calibrated with the cur-rent data of the position and attitude by means of the satellite navigation system and provides measurement data about changes of the movement and about the position and attitude of the vehicle at a higher rate than the satellite navigation system.

3. The Method according to claim 1, characterized in that the measurement data of the satellite navigation system (GNSS) and the inertial measuring system (INS) are coupled by a Kalman filter, wherein, in those periods of time in which the satellite navigation system delivers no data or no evaluable data, the inertial measuring system continues the detecting of the position and attitude of the vehicle.

4. The method according to claim 3, characterized in that data with a repetition rate higher than 10 Hz are available at the output of the Kalman filter.

5. The method according to claim 1, characterized in that the inertial measurement system (INS) is fixedly connected to the vehicle and is operative to measure all three orthogonally arranged translatory accelerations as well as all three orthogonally arranged rotary accelerations.

6. The method according to claim 1, characterized in that the driving dynamics of the vehicle is additionally controlled also by steering intervention.

7. The method according to claim 1, characterized in that position, movement and/or attitude data, and/or data about the change of the position, movement and/or attitude of adjacent other vehicles, and/or data about the condition of the underlying ground particularly with regard to its static friction, are used for the driving dynamics control, and/or that the position, movement and/or attitude data, or data about the change of the position, movement and/or attitude of the vehicle are communicated to adjacent other vehicles.

8. The method according to claim 1, characterized in that the position, movement and/or attitude data or data about the change of the position, movement and/or attitude of the vehicle are communicated to driver assistance systems e.g. for distance measurement, collision avoidance and/or for active protection of the occupants from injury in case of an accident, e.g. an air bag and/or belt tensioner, or extendable roll-over bars.

9. The method according to claim 1, characterized in that the position, movement and/or attitude data or data about the change of the position, movement and/or attitude of the vehicle are al-so used for navigation of the vehicle.

10. The method according to claim 1, characterized in that the driving dynamics of the vehicle is also controlled by electronically adjustable torque distribution (locks, brakes and transmissions) in the power train.

11. The method according to claim 1, characterized in that the pitch angle and the roll angle of the vehicle are electronically adjustable by means of chassis adjustment devices and that the set-ting of these angles is included in the driving dynamics control.

12. The method according to claim 1, characterized in that the driving dynamics of the vehicle is controlled via electronically adjustable spoilers or flaps.

13. The method according to claim 1, characterized in that the vehicle is a single-track vehicle or motorcycle and that a rear-wheel steering system, electronically adjustable by several degrees, is provided for driving dynamics control in case of an inclined position.

* * * * *